March 6, 1928.  
L. F. FISHER  
TOASTER  
Filed Aug. 9, 1926  
1,661,819  
3 Sheets-Sheet 1

Inventor:
Lee Forrest Fisher,
By Hugh K. Wagner
Attorney.

March 6, 1928. 1,661,819

L. F. FISHER

TOASTER

Filed Aug. 9, 1926  3 Sheets-Sheet 3

Inventor:
Lee Forrest Fisher,
By Hugh N. Wagner
Attorney.

Patented Mar. 6, 1928.

1,661,819

UNITED STATES PATENT OFFICE.

LEE FORREST FISHER, OF ST. LOUIS, MISSOURI.

TOASTER.

Application filed August 9, 1926. Serial No. 128,108.

This invention relates to a toaster for toasting bread and the like; and the principal purpose of the invention is to provide a toaster that will serve equally well for toasting either buttered or unbuttered slices of bread, and which, when toasting bread that has been buttered on one side, will hold the bread in such a position that the butter will not run off.

Another object of the invention is to provide a toaster having a respective toast holder facing each one of two opposing sides of a heating means, preferably the upper and lower sides, so that two pieces of bread may be toasted simultaneously, each on a respective side that faces the interposed heating means. Another object is to provide means for quickly exchanging the positions of the toast holders without inverting them, so that the slices of bread that have been toasted on one side may be toasted simultaneously on their other sides without handling them to turn them over.

When toasting buttered bread, the bread is placed on the holder with the buttered side on top, so that the holder that overlies the heating means presents the unbuttered side to the latter, while the holder that underlies the heating means presents the buttered side thereto. The buttered side toasts more slowly than the unbuttered side, and, to toast both sides in the same time to an equal degree, the buttered side must be correspondingly nearer to the heating means than the unbuttered side. Accordingly, it is a further aim of this invention to provide means for adjusting the vertical positions of the holders, whereby both holders may be set at equal distances from the heating means for the purpose of toasting unbuttered bread, or elevated so that the upper holder is more remote from the heating means than the lower holder for the purpose of toasting buttered bread.

Other objects and advantages will appear in the course of the following description of a preferred embodiment of this invention.

In the accompanying drawings forming part of this specification, in which like numbers of reference denote like parts wherever they occur, Figure 1 is a plan view, partly in section on the line 1—1 in Figure 2, of the toaster as it appears with the toast holders extended or withdrawn from the heating means;

Figure 1:
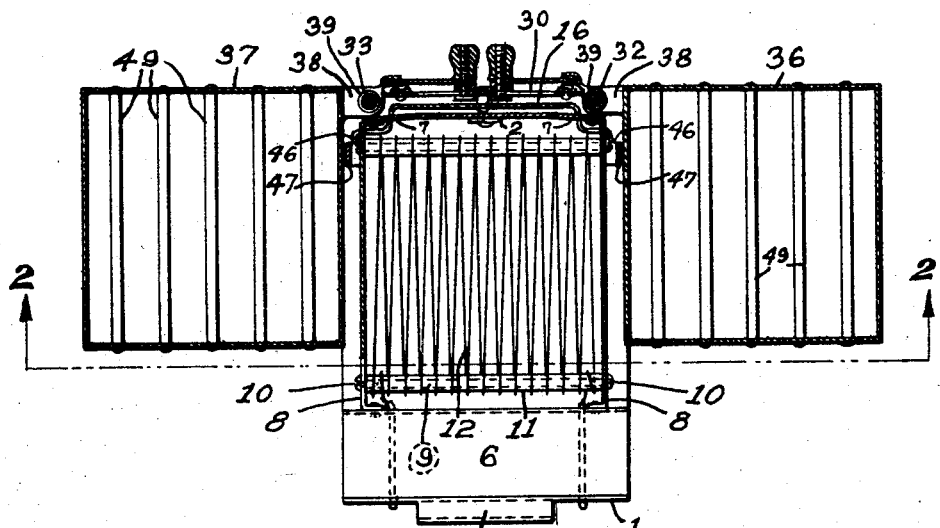

The supporting frame of the toaster is preferably formed of sheet metal and comprises upright portions 1 and 2 at the anterior and posterior ends, respectively, that are connected by a horizontal base portion 3, having downturned lateral flanges 4, that form legs for the base 3. The upper ends of the uprights 1 and 2 are bent outwardly and then downwardly to form handles or flanges 5 by means of which the toaster may be conveniently lifted and carried. The anterior upright 1 loops inwardly at an intermediate portion of its height to form a bracket 6. The posterior upright 2 is narrower than the base 3, and arms 7 project laterally therefrom at the height of the bracket 6. Bars 8, preferably of metal, connect the arms 7 to the bracket 6 at each side of the frame, and are secured thereto in any suitable manner, being preferably riveted thereto. Bars 9, preferably of metal, are disposed transversely of and connect the end portions of the bars 8, being secured thereto preferably by screws 10. Bars 9 are covered with any suitable heat-proof dielectric, such as asbestos 11, and support the heating coils 12, preferably formed of German-silver or other suitable wire having a high resistance to the passage of an electric current. The coils 12 are connected in series to form an electric circuit whose terminals are embodied in the prongs 13, embedded in an insulating block 14, secured to the underside of the base 3 by means of screws 15. The prongs 13 are adapted to fit the recesses of a slide plug of a conventional type that forms one end of a well-known type of flexible cord or electric cable, the other end of which is of plug formation to fit any conventional or usual type of socket outlet of an electrical supply circuit.

Figure 2:
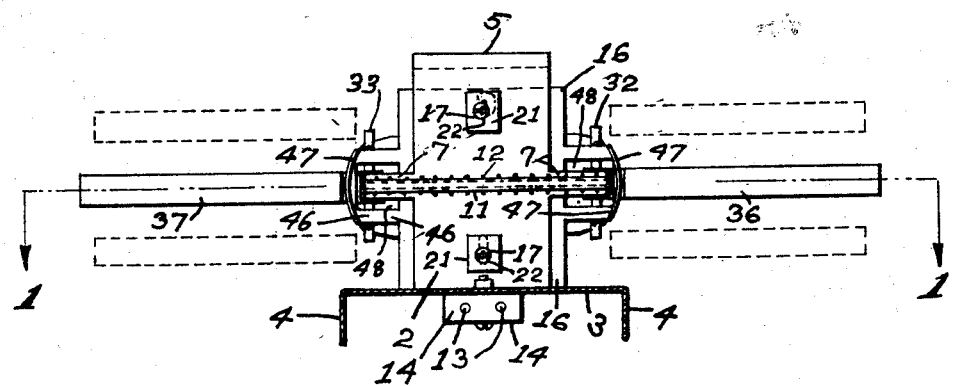
Figure 2 is a vertical sectional view taken on the line 2—2 in Figure 1.
Figures 5, 6, 7:
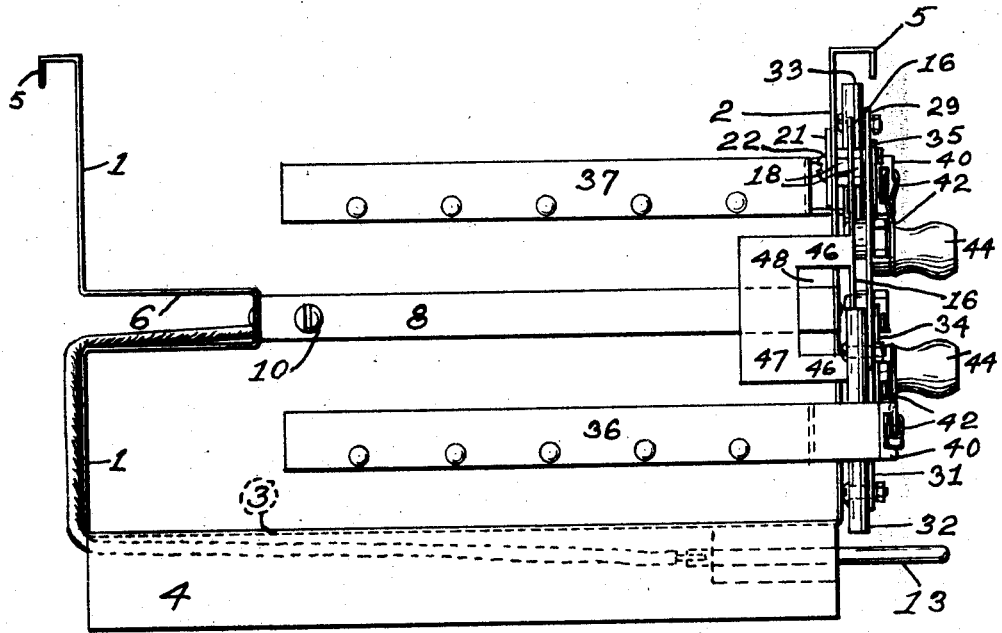
Figure 5 is a side elevation, with the parts in the position shown in Figure 3.
Figure 6 is a fragmentary longitudinal vertical central sectional view, showing details of the rear end of the device, and with the holders in elevated position for toasting buttered bread.
Figure 7 is a view similar to Figure 2, but with parts broken away and with the holders in elevated position for toasting buttered bread.

A second support or sheet metal plate 16 is adjustable vertically on the posterior upright 2 of the first support or frame of the toaster, and means is borne by the plate 16 for carrying the toast holders and for exchanging their respective positions without inverting them. Screws 17 pass through the upper and lower middle portions of plate 16 and are secured thereto by means of nuts 18 on either side thereof. The lower screw 17 passes through a vertical slot 19 in the plate 2, and the upper screw 17 passes through a slot 20 in the plate 2. Washers or plates 21 are interposed between the plate 2 and the heads 22 of the screws 17 on the inner ends of the latter. An inspection of Figures 2 and 7 shows that the slot 20 is of U-shape, comprising an upper horizontal portion 23 and a lower horizontal portion 24 connected by a vertical portion 25. When the upper screw 17 lies in the lower horizontal portion 24 as in Figure 2, the plate 16 is set so that the extreme upper and lower positions of holders are disposed at equal vertical distances from the plane of the heating means 12; and when the upper screw 17 lies in the upper horizontal portion 23, the plate 16 is set so that the extreme upper position of the holders is more remote from the heating means 12 than the extreme lower position of the holders.

Figure 3:
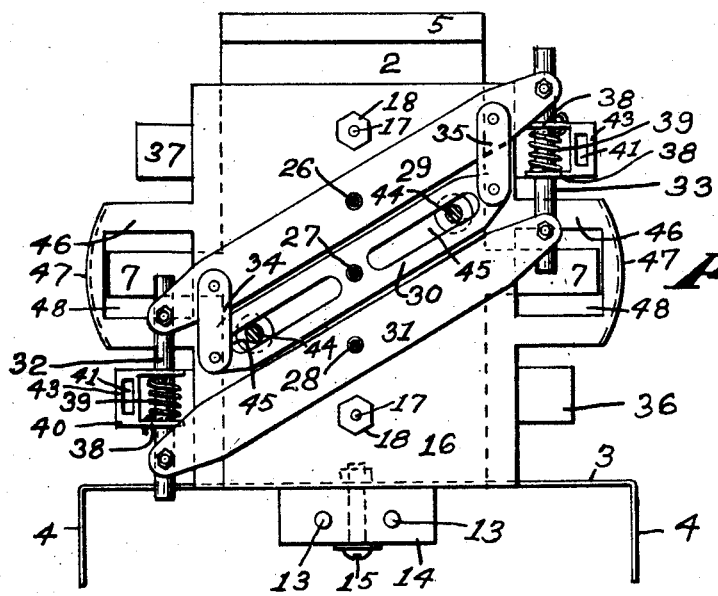
Figure 3 is a rear end view of the toaster, exhibiting the holders in position for toasting unbuttered bread and the operating mechanism in one extreme position, and with parts broken away.
Figure 4:
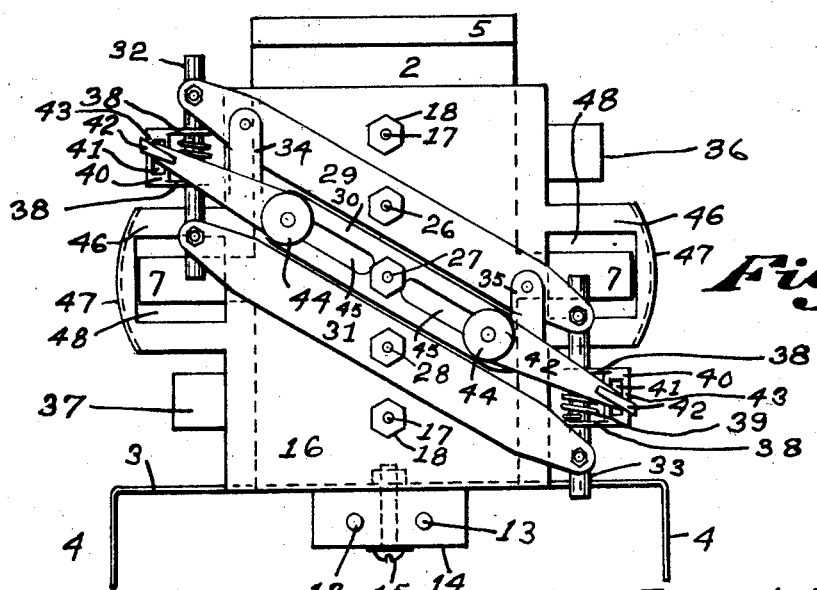
Figure 4 is a similar view, exhibiting the complete operating mechanism in another position.

A series of studs 26, 27, and 28 are affixed to the plate 16 intermediary of and in vertical alinement with the screws 17. The said studs support a parallel motion mechanism comprising parallel levers 29, 30, and 31, pivoted intermediately of their lengths to the studs 26, 27, and 28, respectively; parallel links 32 and 33, having their ends pivotally connected to the ends of the levers 29 and 31 so as to form a parallelogram therewith; and parallel links 34 and 35, having their ends pivotally connected to the levers 29 and 30 so as to form a parallelogram therewith. Links 32 and 33 are preferably of cylindrical or tubular formation, and form vertical pivotal axes for respective toast holders 36 and 37. Each of the holders 36 and 37 comprises a horizontal rectangular sheet metal frame provided with upper and lower horizontal ears or lugs 38 at one corner thereof that are perforated to receive the links 32 and 33, respectively. Torsional springs 39 encompass the links 32 and 33 intermediary of the ears 38, and tend to swing the holders inwardly into vertical alinement with the heating means 12, one end of each spring being connected to one of the ears 38 and the other end being connected to the link 32 or 33 associated therewith. A vertically extending tongue or arm portion 40 projects laterally from each of the holders 36 and 37 at the ears 38, and is perforated at 41 to provide clearance for a tongue 42, that encircles the outer end portion 43 of the arm 40 and is formed integral with a respective handle or knob 44, slidable in a slot 45 in the lever 30. It is manifest that, when both handles 44 are pressed toward one another, the holders will be swung outwardly against the opposition of the springs 39, as shown in Figures 1, 2, and 7; and when the handles 44 are released, will be returned to their inner positions over and under the heating means 12 by reason of the impulsion of springs 39, provided the levers 29, 30, and 31 are inclined in their extreme positions, as shown in Figures 3 and 4. When these levers, however, are tilted from their extreme positions to intermediate positions while the knobs 44 are pressed inwardly towards one another, the return of the holders to their inward positions is prevented when the handles 44 are again released because the path of the returning holders is interrupted by the stops 46, as shown in Figures 1, 2, and 7. The stops 46 are preferably formed as lateral extensions of the plate 16, and present forwardly extended flanges 47 at their outer ends to provide ample surface to be engaged by the holders. The laterally extending portions of the stops are provided with openings 48 therein to accommodate the arms 7. The holders 36 and 37 are provided with an openwork bottom or grating 49, preferably formed of metal cross-bars riveted to the frames of the holders.

The construction of the toaster having been fully described, the manner of using it will be readily understood. Assuming that unbuttered bread is to be toasted and that the parts of the toaster are in the positions shown in Figures 3 and 5, the handles 44 are pressed inwardly toward one another until the holders 36 and 37 are swung outwardly into their extreme positions, when the levers 29, 30, and 31 are turned by means of the handles 44 into the horizontal position shown in Figures 1 and 2, wherein the stops 46 prevent the holders from being swung inwardly when the handles are released. The bread is next placed in the holders, and the knobs 44 are manipulated to return the parts to the positions shown in Figures 3 and 5. An electrical connection having been made from a source of electrical energy to the prongs 13, the bottom of the bread in the upper holder 37 and the top side of the bread in the lower holder 36 are toasted in the same time to the desired degree, when the handles 44 are again manipulated to bring the parts into the position shown in Figure 4, in which the positions of the holders have been exchanged, so that holder 36 is now over the heating means 12 and holder 37 is under the heating means. In this position the remaining sides of the bread will be toasted, after which the knobs 44 may be again manipulated to swing the holders outwardly to remove the toast therefrom.

Should the toaster be employed for making buttered toast, the plate 16 is raised by passing the upper screw 17 into the upper horizontal portion 23 of the slot, thereby elevating both the upper and the lower holders. The bread is placed in the holders with the buttered side on top and, the lower holder now being nearer and the upper holder more remote from the heating means, the upper buttered side of the bread in the lower holder will be toasted to the same degree in the same time as the unbuttered bottom side of the bread in the upper holder. When one side of each piece of bread has been toasted, the positions of the holders may be exchanged, and the other sides of the bread toasted.

It will be observed that the handles 44, and levers 29, 30, and 31 and their associated parts form means for rapidly exchanging the positions of the holders without inverting them, making it unnecessary to turn the bread over by hand to toast the opposite side.

Having thus fully described this invention, I hereby reserve the benefit of all changes in form, arrangement, order, or use of parts, as it is evident that many minor changes may be made therein without departing from the spirit of this invention or the scope of the following claims.

I claim:

1. A toaster comprising a support; heating means borne thereby and presenting opposing radiating faces; and a toast holder borne by the support so as to be shiftable in a plane parallel to the said faces toward and away from the heating means, and so as to be resiliently urged toward the latter, and, also, so as to be shiftable at will into or on either side of the plane of the heating means.

2. A toaster comprising a support, heating means borne thereby and presenting opposing radiating faces, mechanism borne by the said support and presenting opposing portions that are shiftable simultaneously in opposite directions transversely to the plane of the radiating faces, a pair of toast holders, each of which is pivoted to a respective one of said portions so as to be shiftable in a plane parallel to said radiating faces toward and away from said heating means and so as to be resiliently urged toward the latter, and manually operated means for shifting said mechanism and said holders.

3. A toaster comprising a support, heating means borne thereby and presenting opposing radiating faces, means intermediately pivoted to the said support so as to be tiltable transversely to the said faces and presenting pivotal axes at either end and disposed transversely to the said faces, a pair of toast holders, each of which is pivoted to the tiltable means about a respective one of said axes so as to be shiftable over the heating means when the tiltable means is inclined in one direction and under the heating means when the tiltable means is inclined in the opposite direction, resilient means tending to swing the holders inwardly, and handles movable with the tiltable means and toward and away from one another and tending to oppose said resilient means to swing said holders outwardly when said handles are pressed toward one another.

4. A toaster comprising a support, heating means borne thereby and presenting opposing radiating faces, a toast holder pivoted to said support and capable of movement in a plane parallel to the latter and resilient means tending to urge said holder toward said heating means.

5. A toaster comprising a support, heating means borne thereby and presenting opposing radiating faces, means intermediately pivoted to the said support so as to be tiltable transversely to the said faces and presenting pivotal axes at either end and disposed transversely to the said faces, a pair of toast holders, each of which is pivoted to the tiltable means about a respective one of said axes so as to be shiftable over the heating means when the tiltable means is inclined in one direction and under the heating means when the tiltable means is inclined in the opposite direction and handles movable with the tiltable means and adapted to swing said holders outwardly when said handles are pressed toward one another.

6. A toaster comprising a support, heating means borne thereby and presenting opposing radiating faces, means intermediately pivoted to said support so as to be tiltable transversely to said radiating faces and presenting pivotal axes at either end, a pair of toast holders, each being pivoted to said tiltable means so as to be shiftable over the heating means when said tiltable means is inclined in one direction and under said heating means when inclined in the opposite direction and resiliently influenced handles movable with said tiltable means and adapted to swing said holders outwardly when said handles are pressed toward one another.

In testimony whereof I hereunto affix my signature.

LEE FORREST FISHER.